United States Patent
Baer et al.

(10) Patent No.: US 9,064,247 B2
(45) Date of Patent: Jun. 23, 2015

(54) USER-CONFIGURABLE ACTIVATION OF CARD APPLETS

(75) Inventors: Matthias Baer, Seattle, WA (US); Michael Connolly, Seattle, WA (US); Alejandro Steckler, Bellevue, WA (US); Sogol Malekzadeh, Sammamish, WA (US); Tirthankar Sengupta, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 397 days.

(21) Appl. No.: 13/526,536

(22) Filed: Jun. 19, 2012

(65) Prior Publication Data

US 2013/0339166 A1  Dec. 19, 2013

(51) Int. Cl.
G06Q 20/00 (2012.01)
G06Q 20/22 (2012.01)
G06Q 20/32 (2012.01)
G06Q 20/40 (2012.01)
G06Q 20/36 (2012.01)

(52) U.S. Cl.
CPC .............. *G06Q 20/00* (2013.01); *G06Q 20/227* (2013.01); *G06Q 20/3278* (2013.01); *G06Q 20/401* (2013.01); *G06Q 20/405* (2013.01); *G06Q 20/367* (2013.01)

(58) Field of Classification Search
None
See application file for complete search history.

(56) References Cited

U.S. PATENT DOCUMENTS

| | | | |
|---|---|---|---|
| 7,967,196 B1* | 6/2011 | Bierbaum et al. | 235/380 |
| 8,060,012 B2* | 11/2011 | Sklovsky et al. | 455/41.1 |
| 8,165,961 B1 | 4/2012 | DiMartino et al. | |
| 2008/0147546 A1* | 6/2008 | Weichselbaumer et al. | 705/41 |
| 2008/0167017 A1 | 7/2008 | Wentker et al. | |
| 2009/0068982 A1 | 3/2009 | Chen et al. | |
| 2010/0217707 A1 | 8/2010 | Phillips | |
| 2011/0218911 A1 | 9/2011 | Spodak | |

OTHER PUBLICATIONS

"NFC in Public Transport", Retrieved at <<http://www.nfc-forum.org/resources/white_papers/NFC_in_Public_Transport.pdf>>, Jan. 2011, pp. 33.
"Security of Proximity Mobile Payments", Retrieved at <<http://www.smartcardalliance.org/resources/pdf/Security_of_Proximity_Mobile_Payments.pdf>>, Publication Number: CPMC-09001, May 2009, pp. 39.

* cited by examiner

*Primary Examiner* — Paul Danneman
(74) *Attorney, Agent, or Firm* — Nicholas Chen; Kate Drakos; Micky Minhas

(57) ABSTRACT

Card applets associated with an electronic wallet are activated and deactivated based on user-defined rules. Based on the rules and a device state, a card emulation state and card applet states are modified to enable or disable completion of transactions. The transactions are between a computing device and a reader such as a point-of-sale terminal. In some embodiments, a user designates a plurality of the card applets as fast cards capable of completing a transaction via near-field communication (NFC) interaction without user input at a time of the transaction.

20 Claims, 6 Drawing Sheets

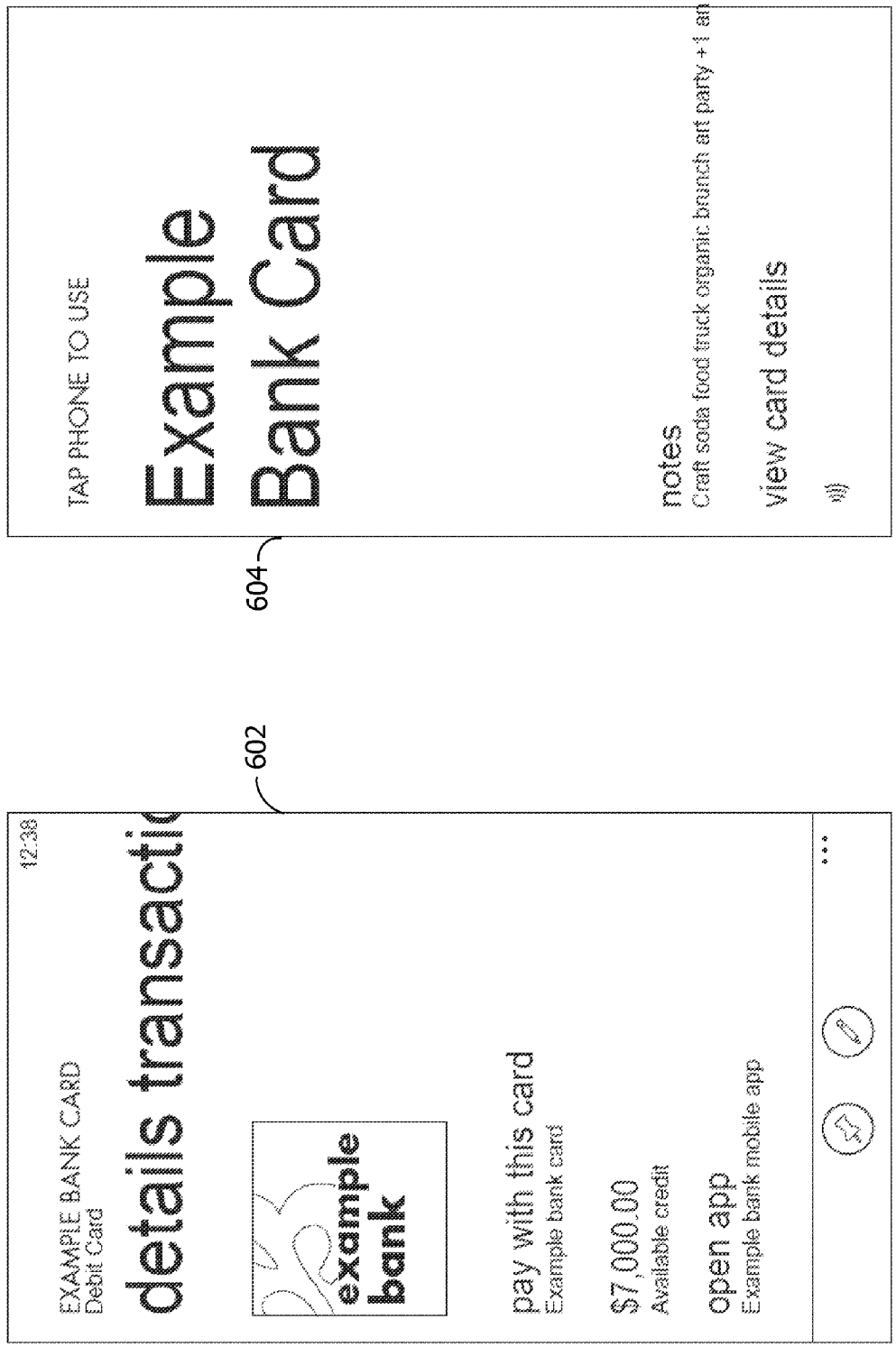

USER-CONFIGURABLE ACTIVATION OF CARD APPLETS

BACKGROUND

Short-range wireless communication protocols enable a computing device to communicate with readers proximate to the computing device. For example, radio frequency identification (RFID), BLUETOOTH brand communications, Wi-Fi, and near-field communication (NFC) technology enable a user to perform actions with the computing device such as completing a financial transaction, gaining access to a building, and gaining entry to a transit system. Existing systems have an electronic wallet that stores a plurality of cards. In some of the existing systems, however, the user is limited to manually selecting and activating one of the cards to complete a transaction. In some of the existing systems where each of the cards remains activated at all times, the reader, rather than the user, chooses among the activated cards to complete a transaction.

SUMMARY

Embodiments of the disclosure selectively activate card applets on a computing device for completing point-of-sale transactions. A device state for a computing device is determined. The computing device has an electronic wallet having a plurality of card applets stored therein. Each of the card applets has a card applet state. A card emulation state is adjusted based on the determined device state. A plurality of user-defined rules for each of the plurality of card applets is accessed. The card applet states are adjusted based on the adjusted card emulation state and the accessed plurality of user-defined rules to enable or disable point-of-sale transactions via the plurality of card applets.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6A is an exemplary diagram illustrating a user interface element for selecting a manually-activated card for a transaction.

FIG. 6B is an exemplary diagram illustrating a user interface element for completing a transaction using a selected manually-activated card.

Corresponding reference characters indicate corresponding parts throughout the drawings.

DETAILED DESCRIPTION

Figure 1:
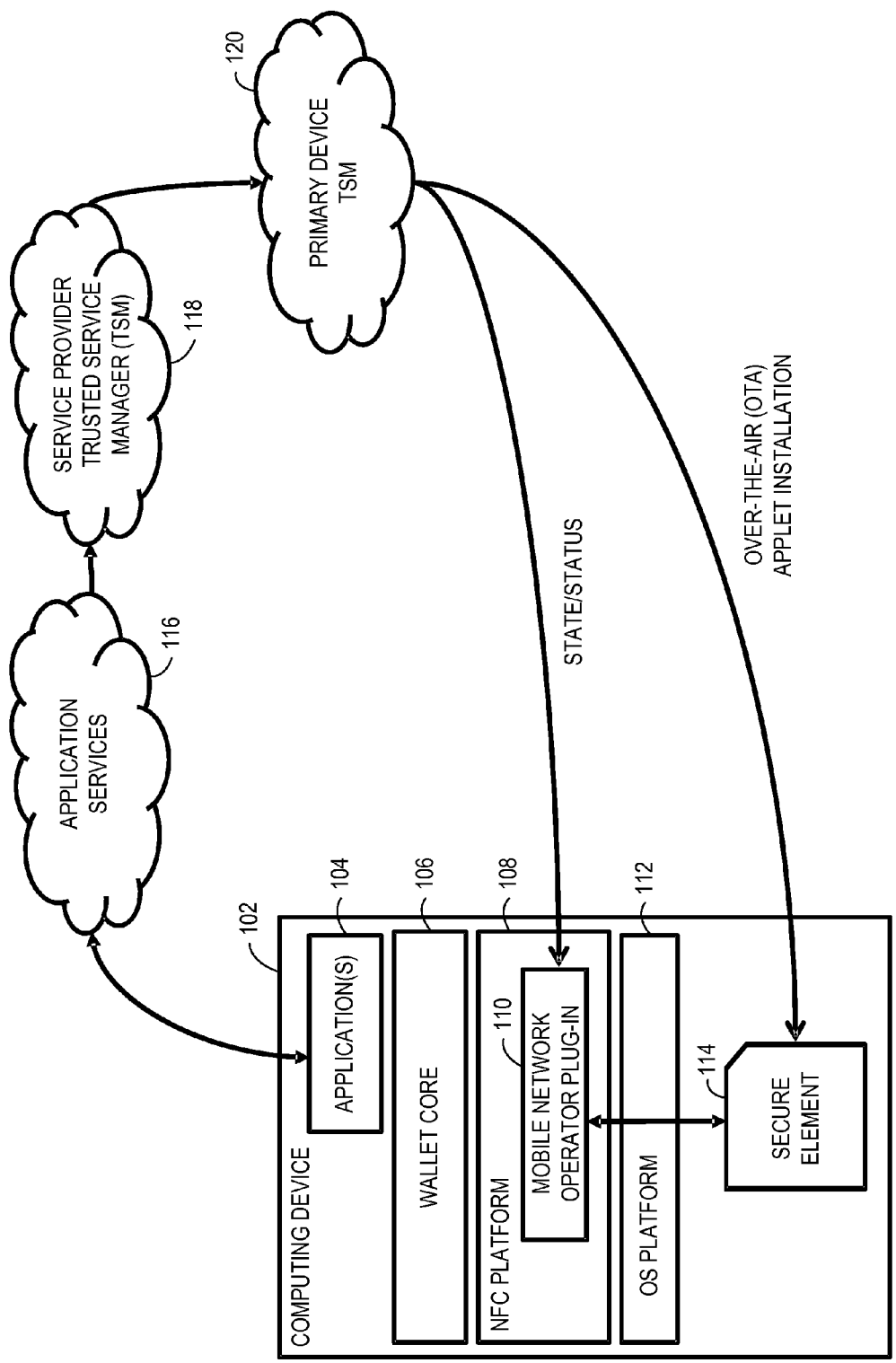
FIG. 1 is an exemplary block diagram illustrating an architecture for installing card applets on a secure element in a computing device.

Referring to the figures, embodiments of the disclosure selectively enable or disable card applets 208 based at least on user-defined rules 214 that operate, in some embodiments, responsive to user actions. A card emulation state 212 and card applet states 210 associated with the card applets 208 are adjusted or modified based on device state and the user-defined rules 214. In some embodiments, a user 202 chooses which card applets 208 in an electronic wallet 207 are to be activated manually to complete a transaction (e.g., manually-activated cards), and which card applets 208 remain active to complete a transaction without user 202 input at a time of the transaction (e.g., fast cards). For each of the fast cards, the user 202 may further configure the availability, conditions, or criteria for activating the fast card, as well as enabling card emulation. The manually-activated cards may also be referred to as "slow cards" or "one-time-use cards." In some embodiments, the manually-activated cards are used to complete only one transaction after being activated. To use one of the manually-activated cards again, the user 202 re-activates the manually-activated card.

While some embodiments are described herein with reference to interactions via near-field communication (NFC), aspects of the disclosure are operable with any wireless communication protocol including, for example, the BLUETOOTH brand wireless communications protocol. Further, while some embodiments are described herein with reference to interactions between a computing device 102 and a point-of-sale terminal, aspects of the disclosure are operable with interactions between the computing device 102 and any reader 224, or other computing device. Still further, while some embodiments are described herein with reference to point-of-sale transactions between the computing device 102 and the reader 224, such as those relating to the acquisition of goods and/or services, aspects of the disclosure are operable with any transactions. For example, the transactions may include transactions not associated with goods and/or services, such as providing user 202 identification, location information, contact information, and the like.

Referring next to FIG. 1, an exemplary block diagram illustrates an architecture for installing card applets 208 on a secure element 114 in the computing device 102. The computing device 102 illustrated in FIG. 1 includes one or more applications 104, a wallet core 106 (e.g., logic for implementing the electronic wallet 207), an NFC platform 108 for implementing NFC interactions, and an underlying operating system (OS) platform 112. The computing device 102 also includes the secure element 114, chip, or other hardware component on the computing device 102 for storing, among other items, one or more card applets 208. The secure element 114 is accessible to the OS platform 112 and to one or more of the readers 224 that are in proximity of the computing device 102. The secure element 114 may be stored in various places on the computing device 102, such as on a motherboard or a universal integrated circuit card (UICC) (e.g., or other removable storage card). The secure element 114 cryptographically protects the information stored thereon (e.g., the card applets 208).

The applications 104 on the computing device 102 communicate with application services 116. Communication between the computing device 102 and the application services 116 (or other services or devices) may occur via one or more networks using any protocol or mechanism over any wired or wireless connection. Each of the application services 116 communicates with a service provider trusted service manager (TSM) 118. The service provider TSM 118 communicates with a primary device TSM 120. The primary device TSM 120 communicates state and/or status with a mobile network operator (MNO) plug-in 110 or other component that is associated with the NFC platform 108 on the computing device 102. The MNO plug-in 110 communicates with the secure element 114 to install card applets 208 received from the primary device TSM 120. For example, the card applets 208 are installed via over-the-air (OTA) installation.

Figure 2:
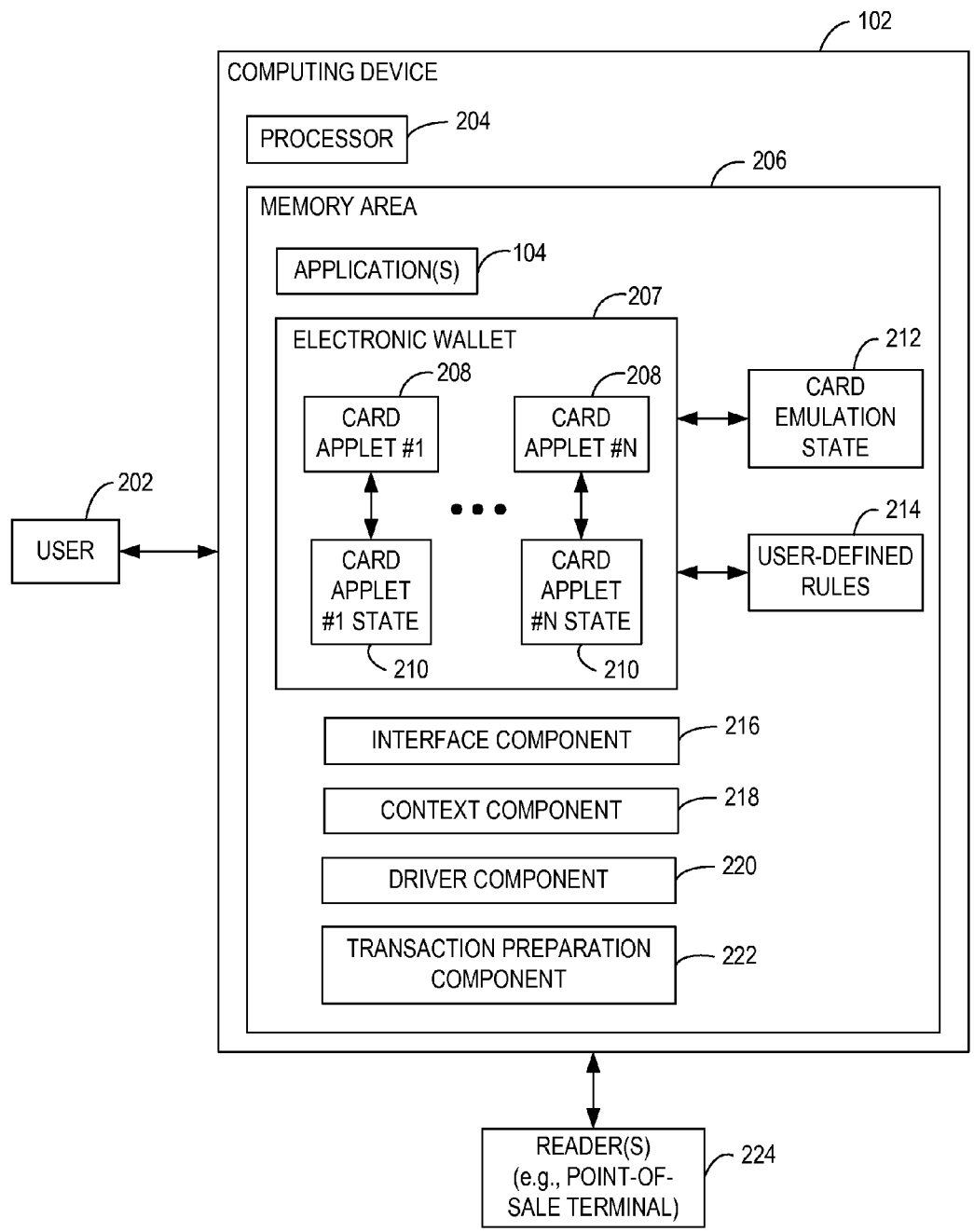
FIG. 2 is an exemplary block diagram illustrating a computing device storing a plurality of card applets.

Referring next to FIG. 2, an exemplary block diagram illustrates the computing device 102 storing a plurality of the card applets 208. In the example of FIG. 2, the computing device 102 represents a system for selectively activating one or more card applets 208 on the computing device 102 for completing any quantity of point-of-sale transactions with one or more of the readers 224 (e.g., point-of-sale terminals). The computing device 102 represents any device executing instructions (e.g., as application programs, operating system functionality, or both) to implement the operations and functionality associated with the computing device 102. The computing device 102 may include a mobile computing device or any other portable device. In some embodiments, the mobile computing device includes a mobile telephone, laptop, tablet, computing pad, netbook, gaming device, and/or portable media player. The computing device 102 may also include less portable devices such as desktop personal computers, kiosks, and tabletop devices. Additionally, the computing device 102 may represent a group of processing units or other computing devices.

In some embodiments, the computing device 102 has at least one processor 204, at least one memory area 206, and at least one user interface (not shown). The processor 204 includes any quantity of processing units, and is programmed to execute computer-executable instructions for implementing aspects of the disclosure. The instructions may be performed by the processor 204 or by multiple processors executing within the computing device 102, or performed by a processor external to the computing device 102. In some embodiments, the processor 204 is programmed to execute instructions such as those illustrated in the figures (e.g., FIG. 3).

In some embodiments, the processor 204 represents an implementation of analog techniques to perform the operations described herein. For example, the operations may be performed by an analog computing device and/or a digital computing device.

The computing device 102 further has one or more computer readable media such as the memory area 206. The memory area 206 includes any quantity of media associated with or accessible by the computing device 102. The memory area 206 may be internal to the computing device 102 (as shown in FIG. 2), external to the computing device 102 (not shown), or both (not shown). In some embodiments, the memory area 206 includes read-only memory and/or memory wired into an analog computing device.

The memory area 206 stores, among other data, one or more applications 104. The applications 104, when executed by the processor 204, operate to perform functionality on the computing device 102. Exemplary applications 104 include mail application programs, web browsers, calendar application programs, address book application programs, messaging programs, media applications, location-based services, search programs, and the like. The applications 104 may communicate with counterpart applications or services (e.g., application services 116) such as web services accessible via a network. For example, the applications 104 may represent downloaded client-side applications that correspond to server-side services (e.g., application services 116) executing in a cloud.

The memory area 206 further stores the electronic wallet 207 having a plurality of card applets 208 stored therein, such as card applet #1 through card applet #N. Each of the card applets 208 is associated with an electronic wallet item or card. For example, the card applets 208 may correspond to payment applets (e.g., credit or debit), access applets (e.g., for gaining access to a building or other area), loyalty applets, transit applets, coupon applets, and gift card applets.

Each of the plurality of card applets 208 has one of the card applet states 210 associated therewith, such as card applet state #1 through card applet state #N. In some embodiments, each card applet 208 maintains its corresponding card applet state 210. The card applet states 210 may be read into the OS via an application programming interface (API) or may be published to the OS by the card applets 208. For example, another applet in the secure element 114 may centralize the card applet states 210 and respond to queries via the API or publish the card applet states 210. In some embodiments, each card applet state 210 stores data indicating whether the corresponding card applet 208 is active or inactive (e.g., available or unavailable to the reader 224, respectively) and installed or uninstalled.

The memory area 206 also stores the card emulation state 212. The card emulation state 212 affects the availability of the electronic wallet 207 for completing transactions. For example, the card emulation state 212 may enable or disable NFC interactions between the computing device 102 and the reader 224, thus acting as a global setting that can enable or disable point of sale transactions without changing any of the card applet states 210.

While the electronic wallet 207, card applets 208, card applet states 210, and card emulation state 212 are shown as being logically stored in memory area 206, some of this data may be physically stored elsewhere on the computing device 102 in some embodiments. For example, the secure element 114 (e.g., a module that is outside the memory area 206) may store the card applets 208 while the memory area 206 stores the card applet states 210 in the electronic wallet 207. In such embodiments, the electronic wallet 207 may store metadata describing the card applets 208, such as a representation of the card applets 208 as well as a link from each of the card applet states 210 in the electronic wallet 207 to the corresponding card applets 208 physically stored in the secure element 114.

Further, in some embodiments, the card emulation state 212 may be physically stored in an NFC driver and/or hardware outside, or separate from, the memory area 206.

The user 202 interacts with the computing device 102, as described below, to define, provide, or make accessible one or more of the rules 214. For example, the user 202 may draft the rules 214 or may select or choose among pre-defined, suggested, or recommended rules. The user-defined rules 214 are stored in the memory area 206, and affect the availability of the electronic wallet 207 and the card applets 208 therein. For example, the user-defined rules 214 may separate the card applets 208 into categories, such as fast cards and slow cards (e.g., manually-activated cards). Card applets 208 designated as fast cards are capable of completing transactions without explicit or manual selection, use, authorization, and/or confirmation input by the user 202. In some embodiments, card applets 208 designated as fast cards are available to the readers 224 without explicit or manual selection by the user 202, but the readers 224 may still attempt to challenge (e.g., authenticate) the user 202 by, for example, asking for a personal identification number (PIN). Further, fast cards may remain active after completing a transaction, or may be deactivated after completing the transaction (e.g., depending on the user-defined rules 214).

In contrast, card applets 208 designated as manually-activated cards are capable of completing transactions only with explicit or manual selection, use, authorization, and/or confirmation input by the user 202.

The rules 214 may also identify other criteria for enabling or disabling the card applets 208. For example, the rules 214 may identify a location for the computing device 102 at which the card applet 208 is enabled. The rules 214 may also identify a time of day or durations during which the card applet 208 is enabled. For example, the user 202 may associate a duration with one of the card applets 208 designated as a fast card such that the fast card deactivates after expiration of the duration.

The memory area 206 further stores one or more computer-executable components. Exemplary components include an interface component 216, a context component 218, a driver component 220, and a transaction preparation component 222. Operation of these components, when executed, is described below with reference to FIG. 3.

In some embodiments, the user interface includes a display (e.g., a touch screen display) and/or computer-executable instructions (e.g., a driver) for operating the display. The user interface may also include one or more of the following to provide data to the user 202 or receive data from the user 202: speakers, a sound card, a camera, a microphone, a vibration motor, one or more accelerometers, a BLUETOOTH brand communication module, global positioning system (GPS) hardware, and a photoreceptive light sensor. For example, the user 202 may input commands or manipulate data by moving the computing device 102 in a particular way.

Figure 3:
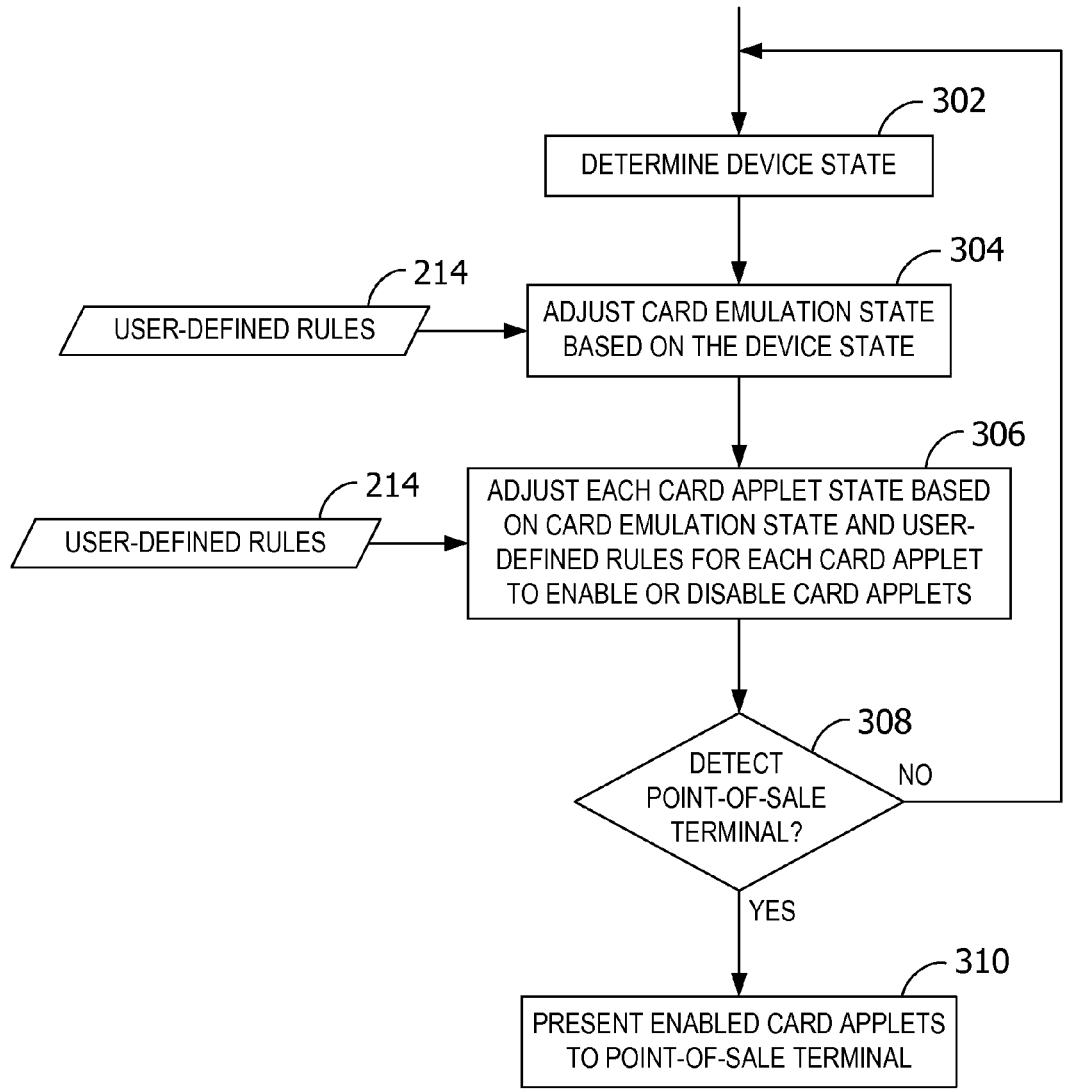
FIG. 3 is an exemplary flow chart illustrating operation of the computing device to enable or disable card applets based on card applet states and a card emulation state.

Referring next to FIG. 3, an exemplary flow chart illustrates operation of the computing device 102 to enable or disable one or more of the card applets 208 based on the card applet states 210 and the card emulation state 212. While the operations illustrated in FIG. 3 are described as being executed by the computing device 102, aspects of the disclosure are operable with other entities executing one or more of the operations. For example, one or more of the operations may be executed by a server remote from the computing device 102 yet in communication with the computing device 102.

At 302, the computing device 102 determines a device state. Determining the device state includes, but is not limited to, determining a hardware state and/or a software state. Determining the hardware state includes determining, for example, whether a display of the computing device 102 is on or off, and whether the computing device 102 is powered on or off. Determining the software state includes determining a current execution context. The execution context, for example, describes one or more of the applications 104 currently being executed by the computing device 102. As another example, the execution context also identifies one or more of the following: whether the electronic wallet 207 is open or closed, whether the electronic wallet 207 is in a foreground of the user interface in the computing device 102 or in the background, and whether the computing device 102 is locked or unlocked. In some embodiments, the electronic wallet 207 and/or the card applets 208 may be locked and/or unlocked with a PIN or other security measure.

At 304, the computing device 102 adjusts or modifies the card emulation state 212 based on the determined device state. For example, the computing device 102 may adjust the card emulation state 212 to be active or inactive. If the card emulation state 212 is set to active, then one or more of the card applets 208 may be available for transactions, depending on the corresponding card applet states 210. If the card emulation state 212 is set to inactive, then none of the card applets 208 is available for transactions, regardless of the corresponding card applet states 210. For example, modifying the card emulation state 212 includes enabling or disabling NFC interaction between the computing device 102 and the reader 224.

In some embodiments, the computing device 102 accesses a plurality of the user-defined rules 214. For each of the plurality of card applets 208, the user-defined rules 214 represent settings or configurations defining the conditions under which the card applets 208 are available or unavailable for transactions. For example, the user-defined rules 214 may designate one or more of the card applets 208 as fast cards, as described above, that are capable of completing point-of-sale transactions without explicit user 202 input.

The card emulation state 212 may also be adjusted based on the user-defined rules 214. For example, if the user-defined rules 214 specify that none of the card applets 208 should be available when the computing device 102 is powered off, the computing device 102 adjusts the card emulation state 212 to "inactive" when the computing device 102 powers off, thus disabling each of the card applets 208 (e.g., preventing the card applets 208 from completing transactions while the computing device 102 is powered off).

At 306, the computing device 102 adjusts or modifies the card applet states 210 based on the adjusted card emulation state 212 and the user-defined rules 214 to enable or disable point-of-sale transactions via the plurality of card applets 208. For example, one of the card applet states 210 may be set to inactive or otherwise disabled, thus making the corresponding card applet 208 unavailable for transactions. In another example, one of the card applet states 210 may be set to active or otherwise enabled, thus making the corresponding card applet 208 available for transactions.

In general, the card emulation state 212 and/or the card applet states 210 are used to control the availability of the card applets 208. In some embodiments, the card emulation state 212 is adjusted to control when card applets 208 designated as fast cards are available, while the card applet states 210 are used to designate which of the card applets 208 are fast cards. Other embodiments, however, lack the card emulation state 212. In such embodiments, the card applet states 210 are used both to control when the card applets 208 are available and to designate which of the card applets 208 are fast cards.

In embodiments in which the user-defined rules 214 identify some card applets 208 as fast cards and other card applets 208 as manually-activated cards, the computing device 102 may adjust the card applet states 210 to enable the fast cards when the electronic wallet 207 is open. Alternatively or in addition, the computing device 102 may adjust the card applet states 210 to enable the fast cards when a display of the computing device 102 is on. As another example, the computing device 102 may adjust the card applet states 210 to disable the fast cards when the computing device 102 is locked. In still another example, the computing device 102 may adjust the card applet states 210 to keep the fast cards enabled even when the computing device 102 is powered off. In such an example, the fast cards obtain power to complete transactions via the mechanism involved in the communication between the secure element 114 and the reader 224. For example, during an NFC interaction, power is derived from an electromagnetic field provided by the reader 224.

Adjusting the card applet states 210 produces a set of one or more of the card applets 208 that are available for transactions. If a point-of-sale terminal or other reader 224 is detected at 308, the computing device 102 presents, or otherwise makes available, the available set of card applets 208 (e.g., enabled) at 310 for completing the transaction. Selection of one of the available card applets 208 may occur according to any selection process, as known in the art.

While examples of the user-defined rules 214 have been described herein, aspects of the disclosure are operable with any rules that affect the availability of the card applets 208 for completing transactions.

In some embodiments, the computer-executable components illustrated in FIG. 2 execute to perform one or more of the operations illustrated in FIG. 3. For example, the interface component 216, when executed by at least one processor 204 of the computing device 102, causes the processor 204 to present to the user 202 the electronic wallet 207 in a user interface element and to receive, from the user 202 via the user interface element, one or more of the user-defined rules 214. The user-defined rules 214 correspond to the electronic wallet 207 and/or the plurality of card applets 208 displayed in the electronic wallet 207.

The context component 218, when executed by at least one processor 204 of the computing device 102, causes the processor 204 to determine a device state for the computing device 102. The driver component 220, when executed by at least one processor 204 of the computing device 102, causes the processor 204 to adjust the card emulation state 212 based on the device state determined by the context component 218. The transaction preparation component 222, when executed by at least one processor 204 of the computing device 102, causes the processor 204 to adjust the card applet states 210 based on the card emulation state 212 adjusted by the driver component 220 and the one or more user-defined rules 214 received by the interface component 216 to enable or disable point-of-sale transactions via the plurality of card applets 208.

Figure 4:
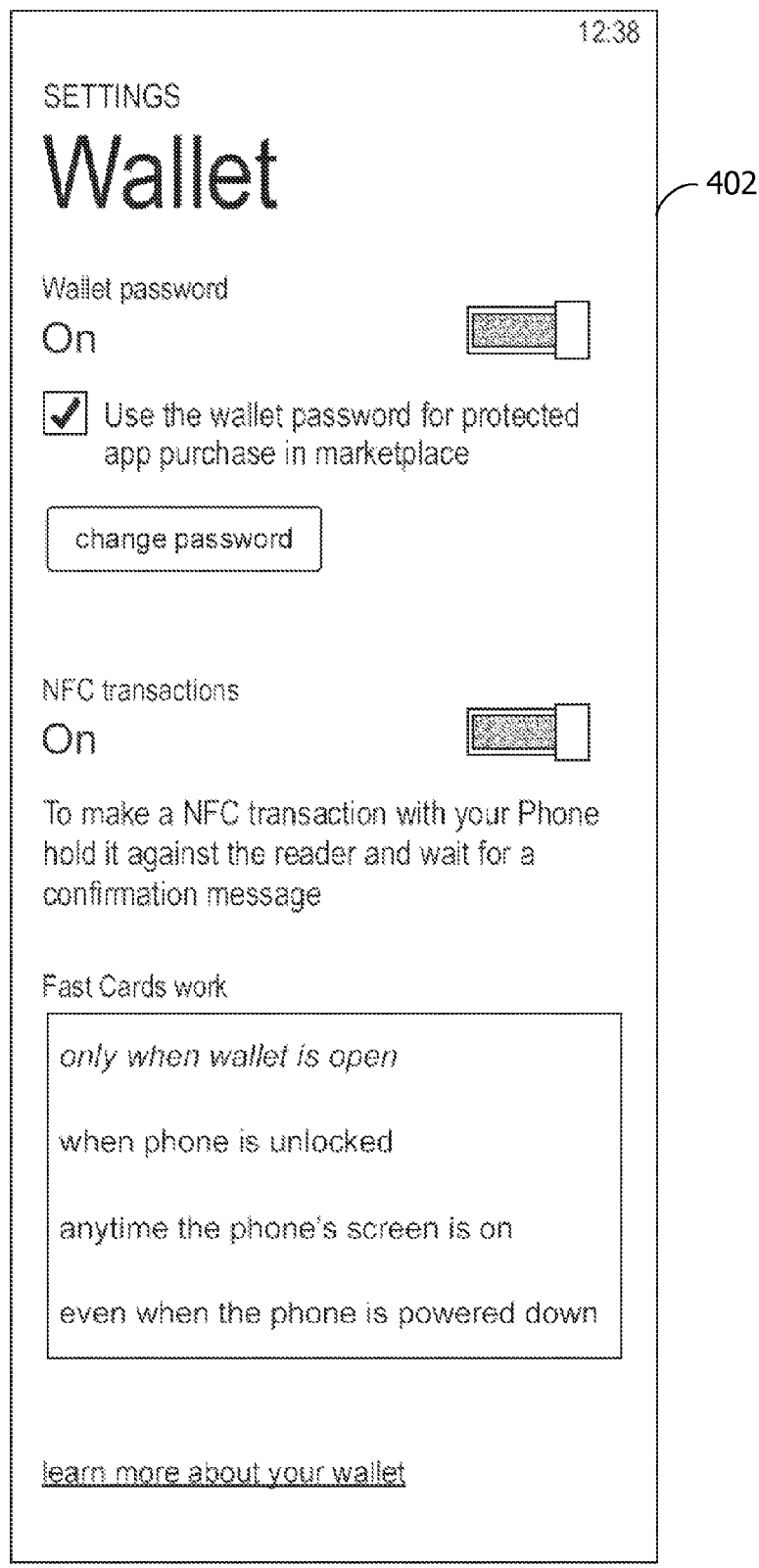
FIG. 4 is an exemplary diagram illustrating a user interface element for configuring settings associated with an electronic wallet.

Referring next to FIG. 4, an exemplary diagram illustrates a user interface element 402 for configuring settings associated with the electronic wallet 207. While the user interface element 402 illustrated in FIG. 4 shows a set of exemplary configurations on a mobile telephone, aspects of the disclosure are operable with any quantity or type of settings or configurations on any mobile device. In the example of FIG. 4, the user 202 has provided a password for entry to make purchases via an online marketplace. The user 202 has also enabled NFC transactions.

The user interface element 402 further illustrates a set of configuration options for selection by the user 202. In this example, the configuration options relate to enabling the user-selected set of fast cards (1) only when the electronic wallet 207 is open, (2) when the mobile telephone is unlocked, (3) anytime the screen or display of the mobile telephone is on, or (4) even when the mobile telephone is powered down or off. If the user 202 selects option (1), the mobile telephone turns on card emulation (e.g., adjust the card emulation state 212 to allow any card applet 208 with a corresponding card applet state 210 of "active" to complete a transaction) when the user 202 opens the electronic wallet 207. The mobile telephone turns off card emulation (e.g., adjusts the card emulation state 212 to disable each of the card applets 208, regardless of the corresponding card applet states 210) as soon as the user 202 closes the electronic wallet 207 or switches to another user interface element.

If the user 202 selects option (2), the mobile telephone turns on card emulation when the user 202 unlocks the mobile telephone and turns off card emulation when the user 202 locks the mobile telephone. If the user 202 selects option (3), the mobile telephone turns on card emulation when the user 202 turns on the display, even if the mobile telephone is locked. The mobile telephone turns off card emulation when the user 202 turns off the display. If the user 202 selects option (4), the mobile telephone keeps card emulation on even when the mobile telephone is turned off. In this option, card emulation may remain on even if a battery is removed from the mobile telephone (e.g., depending on whether hardware associated with the mobile telephone uses any power from the battery).

In the example of FIG. 4, the user 202 has selected option (1), thus enabling the selected set of fast cards only when the electronic wallet 207 is open (e.g., the electronic wallet 207 is in the foreground of the display of the mobile telephone).

Additional user-defined rules 214 (not shown) may indicate whether the mobile telephone prompts for a password to open the electronic wallet 207 or unlock the mobile telephone.

Figure 5:
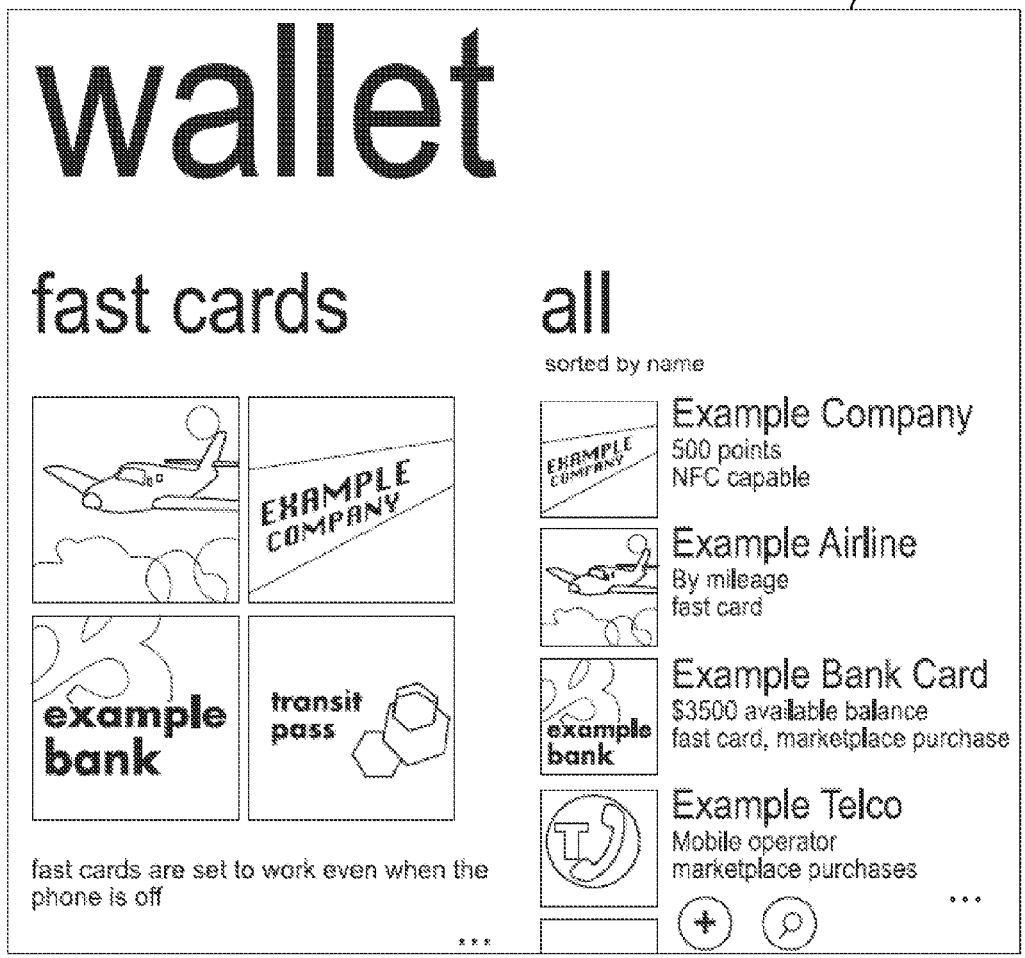
FIG. 5 is an exemplary diagram illustrating a user interface element displaying a set of fast cards selected and configured by a user.

Referring next to FIG. 5, an exemplary diagram illustrates a user interface element 502 displaying a set of fast cards selected and configured by the user 202. In some embodiments, the user interface element 502 represents the electronic wallet 207. In this example, the user 202 has selected four card applets to be "fast cards," or otherwise activated the four card applets as described above. The fast cards are shown on the left side of the user interface element 502, while a list of the available cards is shown on the right side of the user interface element 502. The available cards include both fast cards (e.g., active) and manually-activated cards (e.g., inactive). The user 202 may designate one or more of the available cards as fast cards by, for example, selecting a menu item or dragging the card to the set of fast cards.

Referring next to FIG. 6A, an exemplary diagram illustrates a user interface element 602 for selecting a manually-activated card for a transaction. In the example of FIG. 6A, the user 202 opens the electronic wallet 207 and reviews the set of card applets (e.g., by sliding through each of the card applets). The mobile telephone prompts the user 202 to select the currently presented card applet to complete a transaction. The user interface element 602 provides information relating to the presented card applet, such as a company name, available credit, and a link or other reference to execute an application (e.g., one of the applications 104) associated with the card applet.

Referring next to FIG. 6B, an exemplary diagram illustrates a user interface element 604 for completing a transaction using a selected manually-activated card. Continuing the example from FIG. 6A, the user 202 has selected or tapped on the presented card applet. The mobile telephone adjusts the card applet state 210 for the selected card applet to "active." The user interface element 604 in FIG. 6B then prompts the user 202 to complete the transaction. The user 202 taps on the display to complete the transaction using the selected, activated card applet. Because the card applet is a manually-activated card, the mobile telephone adjusts the card applet state 210 of the selected card applet to disable or deactivate the card applet after the transaction completes.

Further, after the transaction completes, the mobile telephone may operate to reactivate one or more of the fast cards that were deactivated to enable use of the manually-activated card. For example, in environments where only one payment card may be active at any given time, in response to the user 202 activating one of the manually-activated cards, the mobile telephone deactivates any other active payment cards that have been designated as fast cards. After the transaction with the manually-activated card completes, the mobile telephone re-activates the fast card(s) that were de-activated.

Additional Examples

In some embodiments, the user-defined rules 214 specify locations for enabling one or more of the card applets 208 designated as fast cards. Such embodiments provide the user 202 with the capability to specify one card applet 208 (e.g., corresponding to a business credit card) as one of the fast cards available only while the user 202 is near a location designated as a workplace. Similarly, the user 202 may specific a different card applet 208 (e.g., corresponding to a personal credit card) as one of the fast cards available in locations other than the designated workplace location.

The user-defined rules 214 may also specify times during which one or more of the card applets 208 designated as fast cards are available. For example, the user 202 may specify that one card applet 208 (e.g., corresponding to a business credit card) as one of the fast cards available only during business hours. The user 202 may specify a different card applet 208 (e.g., corresponding to a personal credit card) as one of the fast cards available during times other than business hours.

In some embodiments, the card emulation state 212 and/or one or more of the card applet states 210 may be adjusted by the user 202 pressing one or more physical elements of the computing device 102. For example, the computing device 102 may include one or more buttons (e.g., virtual or physical) that the user 202 pushes to activate or deactivate one or more of the card applets 208. The user 202 may toggle the card emulation state 212 and/or one or more of the card applet states 210 in this manner, or the user 202 may push and hold the buttons to adjust the states. Further, some embodiments contemplate the computing device 102 including security elements such as a fingerprint reader to authenticate the user 202 before adjusting the card emulation state 212 and/or the card applet states 210.

At least a portion of the functionality of the various elements in FIG. 1 and FIG. 2 may be performed by other elements in FIG. 1 or FIG. 2, or an entity (e.g., processor, web service, server, application program, computing device, etc.) not shown in FIG. 1 or FIG. 2.

In some embodiments, the operations illustrated in FIG. 3 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While no personally identifiable information is tracked by aspects of the disclosure, embodiments have been described with reference to data monitored and/or collected from users 202. In such embodiments, notice is provided to the users 202 of the collection of the data (e.g., via a dialog box or preference setting) and users 202 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, exclude propagated data signals, and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user 202 in any way, including from input devices such as a keyboard or pointing device, via gesture input, and/or via voice input.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for selectively activating one or more of the plurality of card applets 208 on the mobile computing device for completing point-of-sale transactions.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for selectively activating card applets on a mobile computing device for completing point-of-sale transactions, said system comprising:
a memory area associated with the mobile computing device, said memory area storing an electronic wallet having a plurality of card applets stored therein, each of the plurality of card applets having a card applet state; and
a processor programmed to:
receive, from a user of the mobile computing device, a plurality of user-defined rules corresponding to the plurality of card applets;
determine a device state for the mobile computing device;
modify a card emulation state based on the determined device state to enable or disable near-field communications between the mobile computing device and a point-of-sale terminal; and
modify one or more of the card applet states based on the modified card emulation state and the received plurality of user-defined rules to enable or disable point-of-sale transactions via the plurality of card applets.

2. The system of claim 1, wherein the processor is programmed to modify the one or more of the card applet states by designating one or more of the plurality of card applets as fast cards that complete point-of-sale transactions without explicit user input.

3. The system of claim 1, wherein the processor is programmed to modify the one or more of the card applet states by designating one or more of the plurality of card applets as manually-activated cards that complete point-of-sale transactions only with explicit user input.

4. The system of claim 1, wherein a global setting of the near field communication is based on the card emulation state.

5. The system of claim 1, further comprising means for selectively activating one or more of the plurality of card applets on the mobile computing device for completing point-of-sale transactions.

6. A method comprising:
determining a device state for a computing device, said computing device having an electronic wallet associated therewith, said electronic wallet having a plurality of card applets stored therein each having a card applet state;
accessing a plurality of user-defined rules for each of the plurality of card applets and a card emulation state associated with the electronic wallet; and
adjusting the card applet states based on the determined device state, the accessed plurality of user-defined rules, and the accessed card emulation state to enable or disable transactions via the plurality of card applets.

7. The method of claim 6, wherein adjusting the card applet states comprises enabling one or more of the plurality of card applets.

8. The method of claim 7, further comprising presenting the enabled one or more of the plurality of card applets to a point-of-sale terminal.

9. The method of claim 6, wherein determining the device state comprises determining a hardware state and/or a software state.

10. The method of claim 6, wherein determining the device state comprises determining a software state describing one or more application programs executing on the computing device.

11. The method of claim 6, wherein determining the device state comprises determining one or more of the following: whether the electronic wallet is open, whether the electronic wallet is in a foreground of a user interface in the computing device, whether the computing device is locked, whether the computing device is unlocked, whether a display of the computing device is on, whether a display of the computing device is off, whether the computing device is powered on, and whether the computing device is powered off.

12. The method of claim 6, wherein adjusting the card applet states includes adjusting the accessed card emulation state.

13. The method of claim 6, wherein adjusting the card applet states comprises, for each of the card applet states, setting the card applet state to active or inactive.

14. The method of claim 6, wherein the accessed plurality of user-defined rules designate one or more of the plurality of card applets as fast cards that complete the transactions without explicit user input.

15. The method of claim 14, wherein adjusting the card applet states comprises enabling the fast cards when at least one of the following occurs: the electronic wallet is open or when a display of the computing device is on.

16. The method of claim 14, wherein adjusting the card applet states comprises disabling the fast cards when the computing device is locked.

17. The method of claim 14, wherein adjusting the card applet states comprises keeping the fast cards enabled when the computing device is powered off.

18. One or more computer storage media embodying computer-executable components, said components comprising:
an interface component that when executed causes at least one processor to:
present, to a user of a computing device, an electronic wallet in a user interface element, the electronic wallet having a plurality of card applets therein, each of the plurality of card applets having a card applet state associated therewith, and
receive, from the user via the user interface element, one or more user-defined rules corresponding to the electronic wallet and/or the plurality of card applets displayed in the electronic wallet;
a context component that when executed causes at least one processor to determine a device state for the computing device;
a driver component that when executed causes at least one processor to adjust a card emulation state based on the device state determined by the context component; and
a transaction preparation component that when executed causes at least one processor to adjust the card applet states based on the card emulation state adjusted by the driver component and the one or more user-defined rules received by the interface component to enable or disable point-of-sale transactions via the plurality of card applets.

19. The computer storage media of claim 18, wherein the user-defined rules received by the interface component identify, for each of the plurality of card applets, a location for the computing device at which the card applet is enabled.

20. The computer storage media of claim 18, wherein the user-defined rules received by the interface component identify, for each of the plurality of card applets, a time of day during which the card applet is enabled.

* * * * *